(No Model.)
G. W. STINEBRING.
ADJUSTABLE SAW TOOTH.
No. 300,814. Patented June 24, 1884.
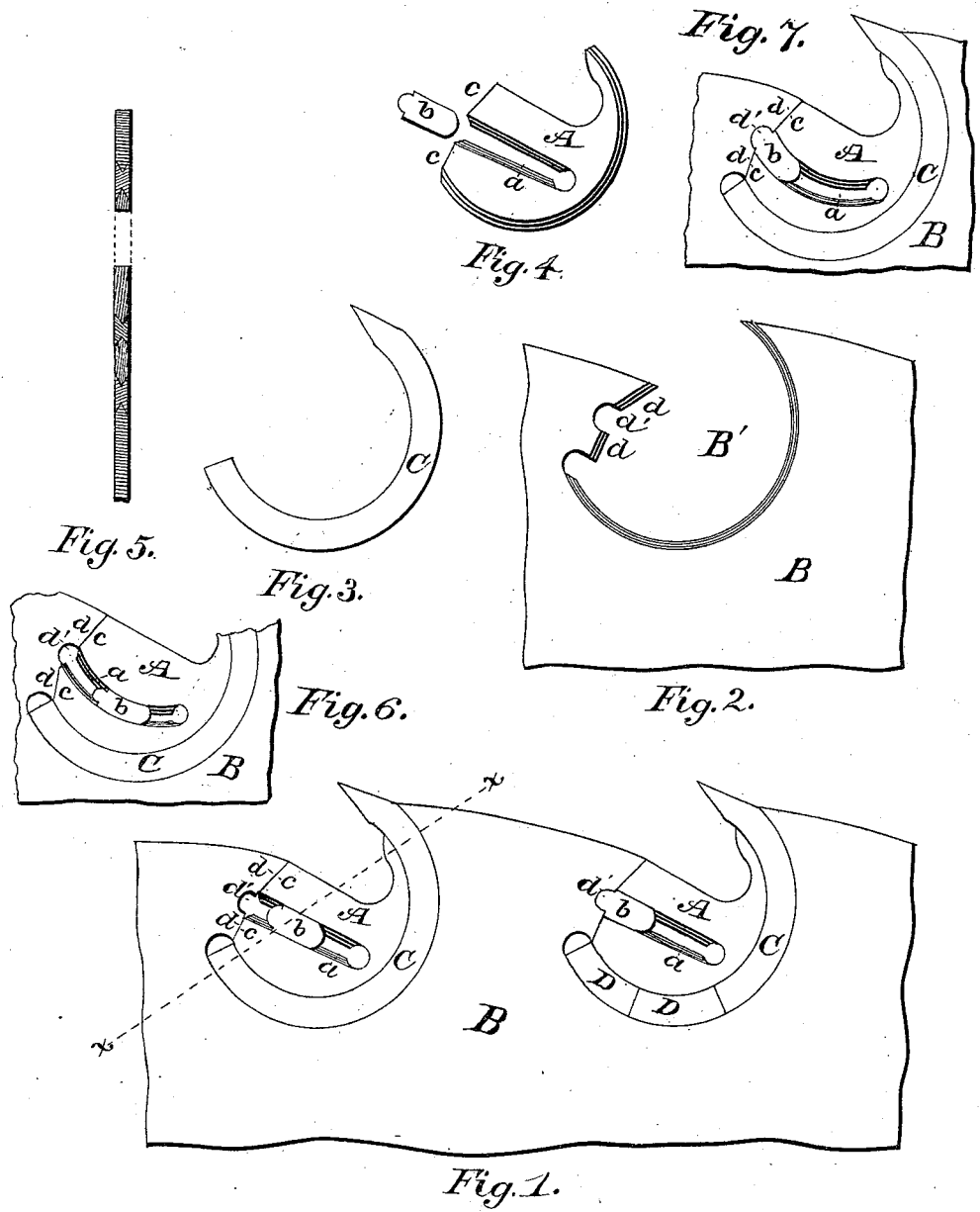
Witnesses:
E. S. Souers
J. H. Hague
Inventor:
Geo. W. Stinebring
Per Fred W. Bond
Atty

UNITED STATES PATENT OFFICE.

GEORGE W. STINEBRING, OF SHREVE, OHIO.

ADJUSTABLE SAW-TOOTH.

SPECIFICATION forming part of Letters Patent No. 300,814, dated June 24, 1884.

Application filed April 26, 1884. (No model.)

*To all whom it may concern:*

Be it known that I, GEORGE W. STINE-BRING, a citizen of the United States, residing at Shreve, in the county of Wayne and State of Ohio, have invented certain new and useful Improvements in Adjustable Saw-Teeth; and I do hereby declare that the following is a full, clear, and exact description of the same, reference being had to the annexed drawings, making a part of this specification, and to the letters and figures of reference marked thereon, in which—

Figure 1 is a side elevation showing part of a saw-blade with my adjustable teeth placed in proper position. Fig. 2 is a side elevation of a part of a saw-plate having a recess for the introduction of a tooth, and also the expansive fastener by means of which the tooth is held firmly in its place. Fig. 3 is a detached view of tooth. Fig. 4 is a detached view of expansive fastener, showing key or wedge detached. Fig. 5 is a transverse section on line $x\ x$, Fig. 1. Fig. 6 is a side view showing a curved slot and the different parts in proper position for fastening the tooth. Fig. 7 is a side view showing the key or wedge in position to adjust the tooth.

The present invention has relation to that class of adjustable saw-teeth in which the teeth can easily be adjusted as they become worn by use; and its nature consists in providing a recess of the form shown in Fig. 2, and in providing an expansive fastener, and in the several parts and combination of parts hereinafter described, and pointed out in the claims.

Similar letters of reference indicate corresponding parts in the drawings.

In the accompanying drawings, A represents the expansive fastener, which is substantially of the form shown in Figs. 1, 4, 6, and 7, and is provided with the slot $a$, said slot being formed straight, as shown in Figs. 1 and 4, when said expansive fastener is large enough to operate the key or wedge $b$. In small-sized fasteners, the slot $a$ should be curved, as shown in Figs. 6 and 7. The key or wedge $b$ being curved to correspond with the curvature of the slot $a$, said key or wedge is placed in the slot $a$, as shown in the drawings. The recess B' is formed in the saw-plate B, as shown in Fig. 2. Said recess is provided with the tongues $d\ d$, said tongues being for the purpose of entering the grooves $c\ c$. This recess B' is also provided with the small recess $d'$, which is for the purpose of receiving the end of the key or wedge $b$, as shown in Figs. 1 and 7, the object being to have the key or wedge $b$ hold the expansive fastener A in the recess B' while the tooth C is being adjusted. The tooth C is in the form of a segment of a circle of any desired diameter, and may be formed with or without tongue or groove on one or both the front and back edge, the recess B' in the plate B being formed with reference to the kind of groove used or formed in the tooth C. As the tooth C becomes worn it is brought forward and the space filled by the blocks D, said blocks being formed so as to correspond in size and curvature to the tooth C.

It will be seen that by my peculiar arrangement I am enabled to easily adjust the tooth C by loosening the key or wedge $b$, and at the same time securely hold said tooth in proper position by tightening said key or wedge.

It will also be seen that by providing the curved slot $a$, I am enabled to increase the throat-room of the saw by cutting away a portion of the expansive fastener above the curved slot, thereby giving room enough for the sawdust when sawing large logs or using fast feed. I am also enabled to keep the saw at all times properly rounded.

Having now fully described my invention, what I claim as new, and desire to secure by Letters Patent, is—

1. The combination, with the saw-blade having the recesses B' and $d'$, of the tooth C, formed of the segment of a circle and adjustable in a circular path in the recess B', the expansible fastener A, having a slot, $a$, and a key, $b$, adapted to move in the slot to expand the fastener and engage the recess $d'$ in the blade, substantially as described.

2. The combination, with the saw-blade having the recess B' and projections $d$, of the segmental tooth C, adjustable in a circular path in the recess, and the expansible fastener A, having grooves $c$ in its end, into which fit the projections on the blade, substantially as described.

3. The combination, with the saw-blade having the recesses B' and d' and projections d, of the segmental saw-tooth C, adjustable in a circular path in the recess B', the slotted expansion-fastener A, having the end grooves, c, into which latter fit the projections on the blade, and the key b in the slot for expanding the fastener, and adapted to enter the recess d' in the blade, substantially as described.

4. The combination, with the saw-blade B, having the recess B', of the saw-tooth C, formed of the segment of a circle, and adjustable in a circular path in the recess, and the expansible fastener A, having a segmental edge bearing upon the segmental edge of the tooth, the expansion of the fastener serving to bind the tooth in place, substantially as described.

5. The combination, with the saw-blade B, having the recess B', of the saw-tooth C, formed of the segment of a circle, and adjustable in a circular path in the recess, the slotted expansible fastener having a segmental edge bearing upon the segmental edge of the tooth and bearing against the saw-blade, and a key in the slot of the fastener for expanding the same to bind the tooth in place, substantially as described.

In testimony that I claim the above I have hereunto subscribed my name in presence of two witnesses.

GEORGE W. STINEBRING.

Witnesses:
E. S. SOWERS,
I. H. HAGUE.